Figure 1:
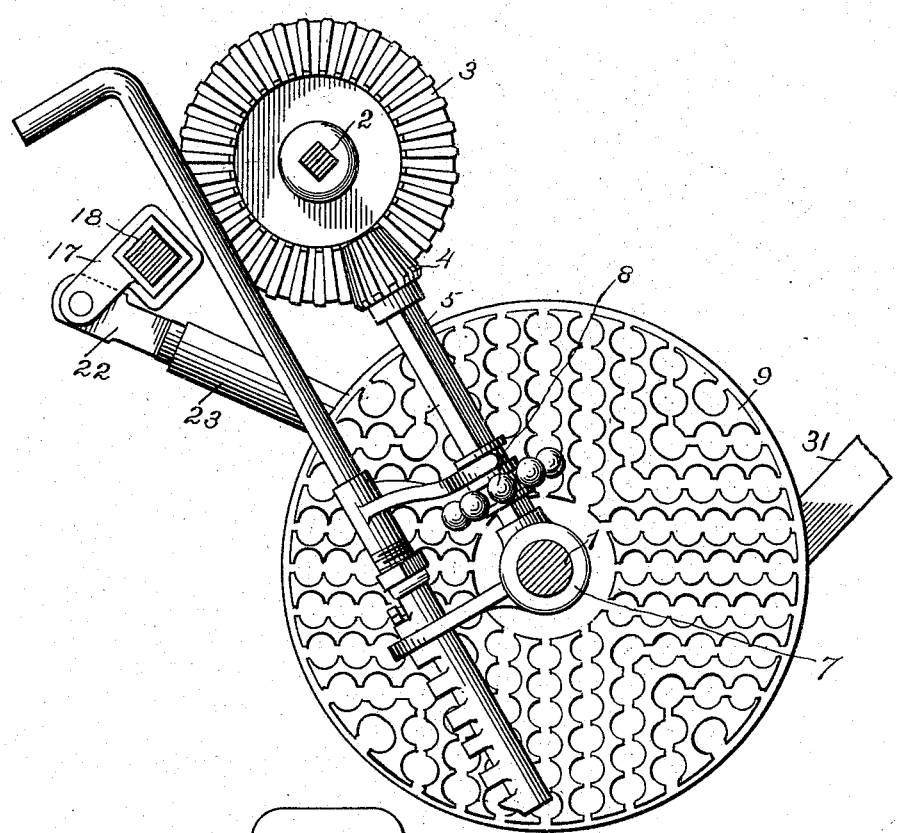

No. 782,579. PATENTED FEB. 14, 1905.
C. H. PELTON.
CHANGE SPEED GEARING FOR AGRICULTURAL IMPLEMENTS.
APPLICATION FILED FEB. 23, 1904.

2 SHEETS—SHEET 1.

Witnesses

Inventor
Charles H. Pelton,

By
Attorney

No. 782,579. PATENTED FEB. 14, 1905.
C. H. PELTON.
CHANGE SPEED GEARING FOR AGRICULTURAL IMPLEMENTS.
APPLICATION FILED FEB. 23, 1904.
2 SHEETS—SHEET 2.
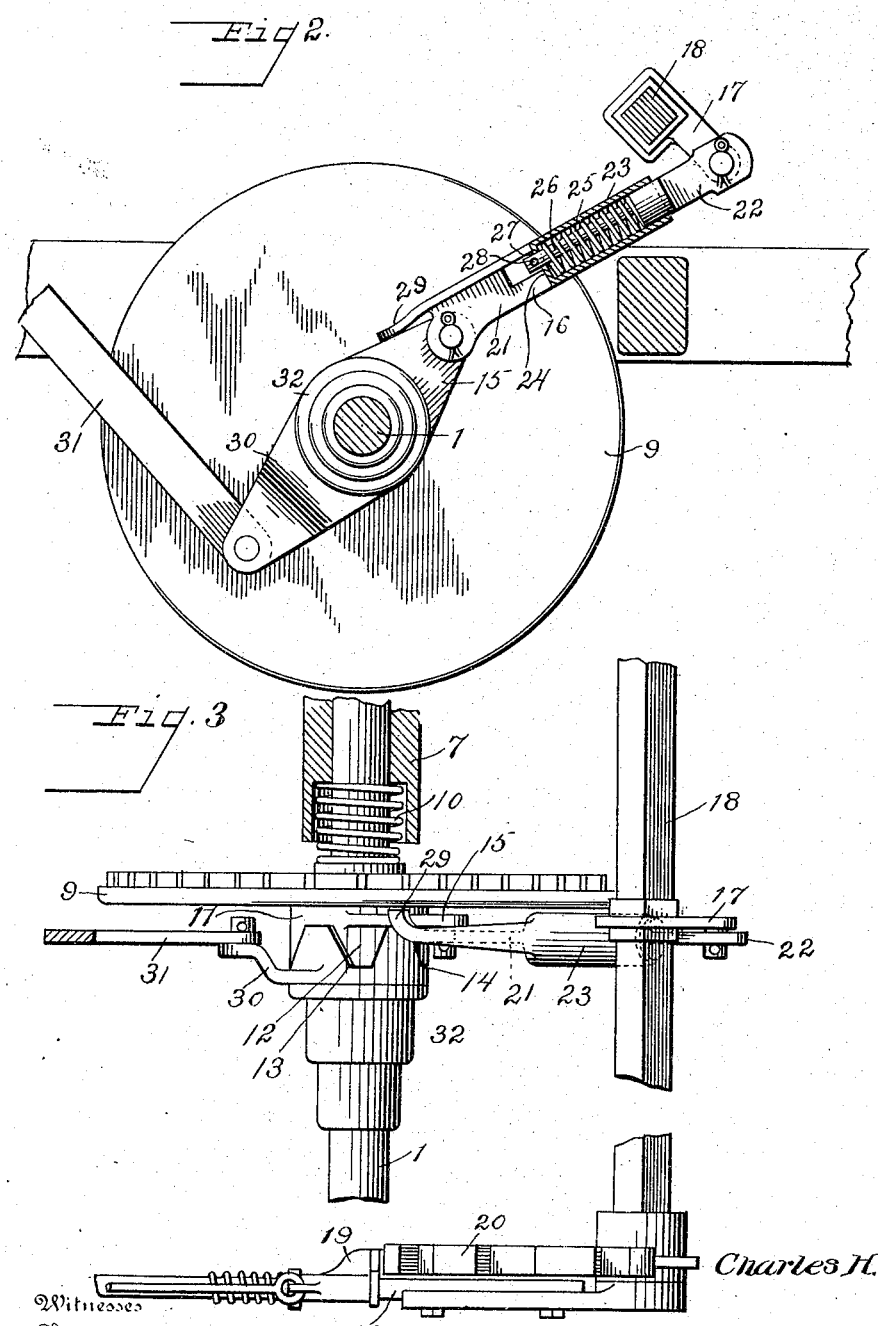
Inventor
Charles H. Pelton, No. 782,579. Patented February 14, 1905.

UNITED STATES PATENT OFFICE.

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

CHANGE-SPEED GEARING FOR AGRICULTURAL IMPLEMENTS.

SPECIFICATION forming part of Letters Patent No. 782,579, dated February 14, 1905.

Application filed February 23, 1904. Serial No. 194,691.

*To all whom it may concern:*

Be it known that I, CHARLES H. PELTON, a citizen of the United States, residing at Springfield, in the county of Clark and State of Ohio, have invented certain new and useful Improvements in Change-Speed Gearing for Agricultural Implements, of which the following is a specification, reference being had therein to the accompanying drawings.

This invention relates to change-speed gearing for agricultural implements, and more particularly to that class of devices of this character in which a disk and pinion are employed, the disk being provided with concentric series of teeth or tooth recesses and the pinion being movable radially relatively to the disk to cause it to engage series at different distances from the center of motion of the disk to vary the speed, the disk and pinion being relatively movable to effect their engagement and disengagement. A structure of this class is shown in Letters Patent No. 704,094, granted to me July 8, 1902, and I have shown my present invention as applied to the structure set forth in said prior patent, although it is of course applicable to other structures of the same general class. In structures of this class engagement of the gears is usually effected by means of an operating-lever having a fixed throw or range of movement—as, for instance, the lever which raises and lowers the drag-bars which carry the furrow-opening devices—the object being to disconnect the gearing when the furrow-opening devices are raised into inoperative position and to connect the gearing when the furrow-opening devices are lowered into operating position. Whether such a lever having double functions is employed or a separate operating means affecting solely the gearing, it is found in practice that the pinion and disk are frequently brought together in a relative position such that they do not properly intermesh, the raised portions or teeth of the two coming into contact instead of the teeth of the one entering into the recesses of the other. Where this occurs there is danger of breakage of the parts when the machine starts, and this is particularly the case where the gear members are brought together by a lever having a fixed throw.

It is the object of my present invention to overcome this difficulty; and to this end my invention consists in certain novel features which I will now proceed to describe and will then particularly point out in the claims.

Figure 4:
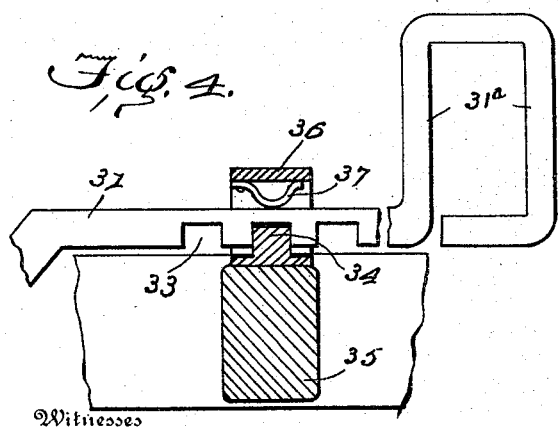

In the accompanying drawings, Figure 1 is an elevation, partly in section, of a mechanism embodying my invention viewed from one side. Fig. 2 is a similar view from the opposite side. Fig. 3 is a plan view, partly in section, and Fig. 4 is a detail elevation, partly in section, showing a locking device for one of the operating-levers.

In the said drawings, 1 indicates the driving-shaft, which may be the axle of a grain-drill, for instance, and 2 the driven shaft, which may be the feed-shaft of the drill, provided with a bevel-gear 3, which meshes with a bevel-pinion 4 on a shaft 5, mounted in suitable fixed bearings, one of which is in a fixed sleeve 7, surrounding the shaft 1. On the shaft 5 is splined a pinion 8, movable longitudinally of said shaft by means of the mechanism shown, which is fully described in my prior patent hereinbefore referred to, or by any other suitable mechanism.

9 indicates a disk rotating with the shaft 1 and movable longitudinally thereof toward and from the pinion 8. This disk has its working face provided with concentric rows of teeth or depressions of any suitable construction—such, for instance, as that shown—which is fully described in my said prior patent. This disk is moved toward and from the pinion, so as to be disengaged therefrom or engaged therewith, by means of a cam and spring, the spring indicated at 10, abutting against the hub of the disk at one end and against the sleeve 7 at the other end, said sleeve being preferably recessed to cover and protect the greater portion of the spring. It will be noted that the spring operates to force the disk away from or out of engagement with the pinion. The movement of the disk in the opposite direction may be effected by means of a cam-collar 11, provided with a cam projection 12, the faces of which are inclined to conform with the similarly-inclined recesses of a cam-recess 13 in a relatively fixed collar 14. The cam-collar 11 is mounted loosely on the shaft 1 and is provided with an arm 15, connected by a link 16 with an arm 17, projecting from a shaft 18, which in the present instance is the rock-shaft, by means of which the drag-bars of the drill are raised and lowered. The arm 17 is provided with an operating-lever 18$^a$, having the usual locking bolt or pawl 19 and coöperating notched quadrant 20. When the drag-bars are lowered to their work, the lever 18$^a$ is thrown over to the end of its range of movement in one direction and locked in that position by means of the bolt and quadrant. This movement should bring the disk into full engagement with the gear; but it will be seen that in case the teeth of these parts do not register properly there is danger of breakage if the connection between the operating-lever and cam be a non-yielding one. To overcome this objection, I construct the link 16 in such a way as to permit it to yield in case the gear and pinion do not properly mesh, so that the operating-lever may be moved to its full stroke and locked in proper position, the yielding link being provided with a spring between its yielding parts, which spring is so actuated by the yielding of the parts as to energize it, so that when the machine starts and the teeth come into meshing position the energy stored up in the spring will act to further turn the cam-collar and bring the disk and pinion into full mesh. In the present instance, where the actuating movement is one of thrust, the spring is compressed during the movement of the operating-lever and gives up its compression in bringing the parts into full engagement.

I prefer to construct the spring-link in the manner shown in detail in the accompanying drawings, in which the link 16 is composed of a member 21, pivoted to the arm 15, and a member 22, pivoted to the arm 17. The member 21 has a barrel or housing 23, open at one end to receive the member 22 and closed at the other end by a diaphragm 24. A coiled spring 25 is located in this housing and bears at one end against the member 22 and at the other end against the diaphragm 24. The member 22 is provided with a shank or extension 26, which passes through the coil of the spring 25 and through an opening 27 in the diaphragm 24, said shank being provided outside of the said diaphragm with a pin or projection 28, which limits the movement of separation of the members 21 and 22. The link 16 is also provided with an extension 29, which is adapted to contact with the arm 15, and so limit the movements of said link and arm as to prevent the parts from getting on a dead-center by preventing the pivotal connection with the link and arm 15 from moving far enough to get into line with the center of the shaft 1 and the pivot connecting the link and arm 17.

I have referred to the collar 14 as a relatively fixed collar, and it may be permanently fixed; but in the present instance I have shown said collar as adapted to rotate on the shaft 1, on which it is mounted, under certain conditions. To this end the collar 14 is provided with an arm 30, to which is connected an operating rod or lever 31, provided with or connected to operating mechanism having suitable locking means. The collar 14 abuts against a sleeve 32, fixed against longitudinal movement relatively to the shaft 1. When the lever 18$^a$ is used as a means for engaging and disengaging the gearing-pinion, the collar 14 remains stationary; but when it is desired to engage or disengage the gearing independently of the lever 18$^a$ the collar 14 may be rotated to effect this result by means of the connection 31. It will be understood, of course, that whenever one of the collars 11 or 14 is employed as the operating agency the other collar is locked against rotation through the medium of its operating mechanism.

The locking device for the operating-rod 31 is shown in detail in Fig. 4 of the drawings. It will be seen that said rod is provided with a handle 31$^a$, by means of which it may be readily operated, and its lower edge is provided with notches 33, which are adapted to engage a locking projection 34, mounted on one of the cross-bars 35 of the frame. The locking-rod passes through a guide or keeper 36, which holds it in position laterally relatively to the locking projection, and a spring 37 holds it normally in engagement with said projection, while permitting it to be disengaged when it is desired to operate the rod.

It will be seen that the structure is simple and efficient and at the same time serves to effectually prevent breakage of the gearing under the conditions described. It will also be seen that the power necessary to bring the gear and pinion into mesh is positively supplied through the medium of the operating-lever and its connections with the shifting cam, the spring merely storing such a portion of this power as may be required to complete the operation if the parts happen to be in a position which prevents their complete meshing. When the operating-lever is moved, the mechanism is thus practically positive in its action and does not rely upon spring-pressure only for the purpose of bringing the parts into mesh.

It will be understood, of course, that while the particular arrangement of parts hereinbefore described and shown in the drawings is such as to require a compression-spring in the link 16 other arrangements of the parts might be made in which the spring would be expanded by the action of the operating-lever, its subsequent contraction effecting the enmeshing of the disk and pinion. Other modifications will readily suggest themselves, and I therefore do not wish to be limited to the particular details of construction hereinbefore described, and shown in the accompanying drawings.

Having thus fully described my invention, what I claim as new, and desire to secure by Letters Patent, is—

1. A change-speed gearing, comprising a disk and pinion, the pinion radially movable relatively to the disk, and one of them movable toward and from the other, in combination with a cam for positively engaging said gear members, and operating mechanism for said cam, comprising a spring-link, substantially as described.

2. A change-speed gearing, comprising a disk and pinion, the pinion being radially movable relatively to the disk, and one of said members being movable toward and from the other, in combination with a cam for positively causing the engagement of said members, and operating mechanism comprising an operating-lever, locking mechanism for locking said lever at the end of its full stroke, and a spring-link intermediate said lever and cam, substantially as described.

3. A change-speed gear, comprising a shaft, a pinion movable radially thereto, a disk rotating with said shaft and movable longitudinally thereon toward and from the pinion, a spring normally disengaging said disk and pinion, an abutment, a cam-collar mounted to rotate on said shaft between said disk and said abutment, and means for operating said cam, substantially as described.

4. A change-speed gear, comprising a shaft, a pinion movable radially thereto, a disk rotating with said shaft and movable longitudinally thereon toward and from the pinion, a spring normally disengaging said disk and pinion, an abutment, a cam-collar mounted to rotate on said shaft between said disk and said abutment, and means for operating said cam, said means comprising a spring-link, substantially as described.

5. A change-speed mechanism, comprising a shaft, a pinion radially movable relatively thereto, a disk rotating with said shaft and movable thereon toward and from the pinion, a spring normally separating the disk and pinion, an abutment, a cam-collar mounted on said shaft and bearing against the disk and against said abutment, said cam also being provided with an arm, a rock-shaft having a corresponding arm and provided with an operating-lever and locking means therefor, and a spring-link connecting the arms of the rock-shaft and cam-collar, substantially as described.

6. A change-speed gear, comprising a shaft, a pinion movable radially relatively thereto, a disk rotating with said shaft and movable longitudinally thereon toward and from the pinion, a spring normally separating said disk and pinion, a fixed abutment, two cam-collars mounted on said shaft between said disk and abutment, and separate operating means for said collars, each provided with locking mechanism, substantially as described.

7. In a change-speed gear of the character described, the combination, with a cam-collar provided with a projecting arm and a rock-shaft provided with a similar arm, of a spring-link connecting said arms and provided with a projection extending over the collar-arm to prevent alinement of the pivotal centers of the parts, substantially as described.

In testimony whereof I affix my signature in presence of two witnesses.

CHARLES H. PELTON.

Witnesses:
E. O. HAGAN,
IRVINE MILLER.